United States Patent
Totzke et al.

(10) Patent No.: US 10,743,179 B2
(45) Date of Patent: Aug. 11, 2020

(54) DOCKING STATION AND METHOD FOR CONNECTING A MOBILE COMMUNICATION DEVICE TO A COMMUNICATION INFRASTRUCTURE

(71) Applicant: Unify GmbH & Co. KG, Munich (DE)

(72) Inventors: Jurgen Totzke, Poing (DE); Johann Zeiner, Karlsfeld (DE); Melih Kucukerdonmez, Ankara (TR)

(73) Assignee: Unify GmbH & Co. KG, Munich (DE)

( * ) Notice: Subject to any disclaimer, the term of this patent is extended or adjusted under 35 U.S.C. 154(b) by 590 days.

(21) Appl. No.: 15/217,050

(22) Filed: Jul. 22, 2016

(65) Prior Publication Data

US 2016/0330625 A1    Nov. 10, 2016

Related U.S. Application Data

(63) Continuation of application No. 14/149,251, filed on Jan. 7, 2014, now abandoned.

(30) Foreign Application Priority Data

Jan. 17, 2013    (DE) .................. 10 2013 000 789

(51) Int. Cl.
*H04Q 5/22*        (2006.01)
*H04W 12/06*       (2009.01)
(Continued)

(52) U.S. Cl.
CPC .......... *H04W 12/06* (2013.01); *G06F 1/1632* (2013.01); *G06F 21/44* (2013.01);
(Continued)

(58) Field of Classification Search
USPC ...................................................... 455/411
See application file for complete search history.

(56) References Cited

U.S. PATENT DOCUMENTS

2008/0157716 A1    7/2008  Jo
2008/0252419 A1*  10/2008  Batchelor ............. G06F 1/1632
                                                              340/10.1
(Continued)

FOREIGN PATENT DOCUMENTS

| CN | 202050263 U | * | 11/2011 |
| DE | 102007044855 A2 | | 5/2008 |
| WO | 2006050206 A1 | | 5/2006 |

OTHER PUBLICATIONS

Budde, Lars 5 kabellose Endgerate fur Smartphones, in online magazine t3n; dated Aug. 21, 2012 (German).
(Continued)

*Primary Examiner* — Gary Lafontant
(74) *Attorney, Agent, or Firm* — Buchanan Ingersoll & Rooney PC

(57) ABSTRACT

A docking station and a method for connecting a mobile communication device to an at least partially wire-based communication infrastructure are disclosed. The docking station has a cradle for the storage of the communication device. A detection device detects the presence of the communication device within a selected distance from the docking station and receives authentication information from the communication device. There is also an authentication device for validating the credentials of the communication terminal and for enabling communication with the communications infrastructure on the basis of authentication information. A first interface provides a first wireless communication link with the communication device and a second interface establishes a second wired communication link to the communication infrastructure. A transfer device can switch from the first communication link to the second communication link. A communication system containing the docking station is also disclosed.

20 Claims, 2 Drawing Sheets

(51) Int. Cl.
    *H04M 1/04*          (2006.01)
    *H04M 1/725*        (2006.01)
    *G06F 21/44*        (2013.01)
    *H04W 4/80*         (2018.01)
    *G06F 1/16*          (2006.01)
    *H04L 29/06*        (2006.01)
    *H04W 84/12*        (2009.01)

(52) U.S. Cl.
    CPC .......... *H04L 63/0823* (2013.01); *H04M 1/04* (2013.01); *H04M 1/7253* (2013.01); *H04M 1/72527* (2013.01); *H04W 4/80* (2018.02); *H04M 2250/04* (2013.01); *H04W 84/12* (2013.01)

(56) References Cited

U.S. PATENT DOCUMENTS

| | | |
|---|---|---|
| 2009/0059907 A1* | 3/2009 | Sindhwani .......... H04L 65/1036 370/354 |
| 2009/0197642 A1 | 8/2009 | Rofougaran et al. |
| 2010/0042671 A1 | 2/2010 | Natt et al. |
| 2010/0083012 A1 | 4/2010 | Corbridge et al. |
| 2011/0320655 A1 | 12/2011 | Dorogusker et al. |
| 2012/0252529 A1 | 10/2012 | Farris et al. |

OTHER PUBLICATIONS

Software-Tipp: Apps fur die Fritzbox-connect; http://www.connect.de/ragteber/apps/fuer-die-fritzbox-1250442.html; dated Feb. 17, 2012(German).

\* cited by examiner

DOCKING STATION AND METHOD FOR CONNECTING A MOBILE COMMUNICATION DEVICE TO A COMMUNICATION INFRASTRUCTURE

CROSS-REFERENCE TO RELATED APPLICATIONS

This application is a continuation application of U.S. patent application Ser. No. 14/149,251, which was filed on Jan. 7, 2014 and claims priority to German Patent Application No. DE 102013000789.5, filed on Jan. 17, 2013.

FIELD OF INVENTION

The present invention pertains to a docking station for connecting a mobile communication device to an at least partially wire-based communication infrastructure, a communication system including such a docking station, and a method for connecting a mobile communication device to an at least partially wire-based communication infrastructure.

BACKGROUND OF THE INVENTION

In today's business environment, tablet PCs, laptops, and smart phones, which may be privately owned, are being increasingly used within companies and integrated into the current IT infrastructures and communication infrastructures. This is often referred to as "Bring Your Own Device" or BYOD. Such devices often include applications or apps for making phone calls as well as for audio and video conferencing. The relatively large screens of tablet PCs and notebooks can be beneficial, specifically for video conferencing.

On the other hand, the frequent plugging and unplugging of cables for establishing communication links and for supplying power are inconvenient, time consuming, and therefore undesirable. Consequently there is a need for a more flexible operation of such devices during which security must always be ensured.

Such devices can be used as communication end points within a company and may be the only end points that are available to the user. On the other hand, the integration of such devices exclusively via wireless connections, such as Wi-Fi or mobile Internet is not optimal, since the safety and/or Quality of Service (QoS) can often only be guaranteed to a limited extent.

A primary object of the invention is to provide a suitable docking station, as well as a communication system that includes the docking station, and an appropriate method by which a user of mobile communication devices can make a flexible and secure connection to an existing communication infrastructure. That communication infrastructure may be within a company that employs the user of the mobile device.

This purpose is achieved by means of a docking station, a communication system and a method as disclosed and claimed herein.

SUMMARY OF THE INVENTION

A docking station by which the mobile communication devices such as tablet PCs and smart phones can be connected to a communication infrastructure, includes a cradle on which the communication device can be placed or stored. The docking station also includes a detection device to detect whether a communication device is located near the docking station and resides within such a distance from the docking station that it can transmit authentication information to the docking station wirelessly. The docking station also includes a validation device to verify that the communication device to be connected to the communication infrastructure is even allowed to communicate.

The validation device can be an electronic circuit or appropriate software to check the authentication information regarding the authorization to communicate. The detection device is for example a Near Field Communication interface (NFC) or a Bluetooth interface that reacts to an RFID chip or an RFID adhesive label on the communication device. The docking station further comprises a first interface by which an initial wireless communication with the communication device can be established and maintained, provided that it has been authorized. The docking station further includes a second interface by which a second wired communication connection to the communication infrastructure is established. Generally speaking, the first and second interfaces permit longer or even permanent communication links to be established and maintained, and over which the communication data can be transmitted. For example, the first interface can be a WLAN interface or a (infrastructure-less) peer-to-peer wireless interface (P2P-WLAN). The second interface can be for example an Ethernet interface. The docking station further comprises a transfer device which connects or transfers or routes the first communication link to the second communication link. A so-called Ethernet switch and/or router are examples of such a transfer device. In the likely event that different IP sub-domains are used, the Ethernet switch can be advantageously combined with a router.

The docking station according to the invention enables the automatic detection of a mobile communication device approaching the docking station, the login into the docking station after validation of the communication permissions of the communication infrastructure and the transfer onto the communication infrastructure. These operations are automated and do not require any additional handling by the user, such as connecting or disconnecting wires, which ensures both the ease of use and the reliability and quality of the data connection.

According to a preferred embodiment of the invention, the detection device is designed for establishing a near field communication, a Bluetooth connection, or both. This is possible in a technically simple, proven and reliable manner.

It is preferred that the docking station includes a firewall that can be configured for example as an Application Layer Gateway (ALG) for protection against malicious software, which could for example be transmitted from the communication device to the docking station. This can be ensured regardless of the software configuration of the communication device so that no malicious software can pass through the docking station into the associated communication infrastructure. The firewall can also include company-specific profiles and for example block the execution of software not desired by the company, although it does not contain viruses, Trojans or similar malware, commonly referred to as malicious software.

It is also beneficial if the docking station comprises a memory device in which an authentication key is stored, by which the authorization information—which may be created for example as a company-specific certificate—can then be checked to ensure that the docking station in which the authentication key is stored is the standard docking station for the specific communication device. If so, the authorization for the communication of the communication device to the communication infrastructure of the relevant docking station can be validated by itself without having to resort to other equipment. This in particular offers a great advantage when, for example, the appropriate authentication service is not currently available.

For a user of the docking station according to the invention, it is beneficial if the docking station comprises a charging station for charging the battery of the communication device placed thereon. It is preferable to design a universal charging station, so that different communication devices from a wide variety of manufacturers can be charged. A further improvement in the user friendliness can be achieved by making wireless charging available, as for example provided by an inductive charger.

Audio capabilities can be enhanced for a user, when the docking station according to the invention comprises a built-in speaker, so that it can be used in addition to the speakers contained in the communication device or instead. The docking station can also include a display, so that a user can use a larger monitor or a larger display with a docking station connected to the communication device. Alternatively or additionally, a connection can be provided for an external display that further increases the diversity of possible application of the docking station according to the invention.

A present preferred communication system includes a docking station according to the above description; one communication infrastructure connected to the docking station via a wired communication link; and at least one mobile communication device. The communication infrastructure may be a local area network of a company. The communication device must comprise a wireless transmission device to signal its presence near the docking station and for transmitting authorization information to the docking station and also a first interface for providing a first wireless communication link with the docking station.

With such a communication system, it is possible in a simple and secure way to connect mobile communication devices easily and safely to a communication infrastructure. For the communication system of the present invention, the advantages and features mentioned for the docking station apply in the same or similar manner.

An objective underlying the invention is also achieved by a method for the use of a mobile communication device in an at least partially wire-based communication infrastructure as described and claimed. "At least partially wire-based" means that the communication infrastructure is at least connected to the docking station via a wired communication link, as this can be done for example by means of an Ethernet connection. Wireless connections may also be provided. The method comprises the following steps: When approaching the docking station, the communication device transmits credential information to the docking station. Then this credential information is checked to determine whether the communication device is allowed to communicate with the communication infrastructure. If communication is permitted, then a first, wireless, communication connection between the communication device and the docking station is established. Because the docking station is connected via a second wire-based communication link to the communication infrastructure, this mobile device now has access to the communication infrastructure through the docking station. The established first communication link is then switched through to the second communications link or relayed so that the communication terminal can communicate with the communication infrastructure.

According to a beneficial improvement of the method according to the invention, the communication device establishes a third, also wireless, communication link to a communication network of its choice when the first communication link (and thus the second communication link) is interrupted. This means that the communication device then automatically switches to a different "channel" and logs on to this other channel.

According to a beneficial embodiment of the method, the authorization information is transmitted in the form of a certificate that has been issued by the communication infrastructure, or at least authorized. The certificate is validated through a dedicated or shared service—locally or in the cloud—which then sends to the docking station the data required for establishing the first wireless communication link between the mobile communication device and the docking station. The first communication link is preferably a P2P connection. The docking station then establishes the P2P connection via WLAN with the communication device. This connection is then—preferably via an Ethernet switch—passed in the docking station to the second communication link (preferably a LAN that has been established over Ethernet.)

It is understood that the method according to the present invention can also be implemented in the form of a computer program or a computer program product, and that such a software storing machine-readable data is to be regarded as an object of the present invention.

Further benefits, features and characteristics of the present invention become apparent from the following description of beneficial embodiments with reference to the drawings.

DESCRIPTION OF THE PREFERRED EMBODIMENTS

Figure 1:
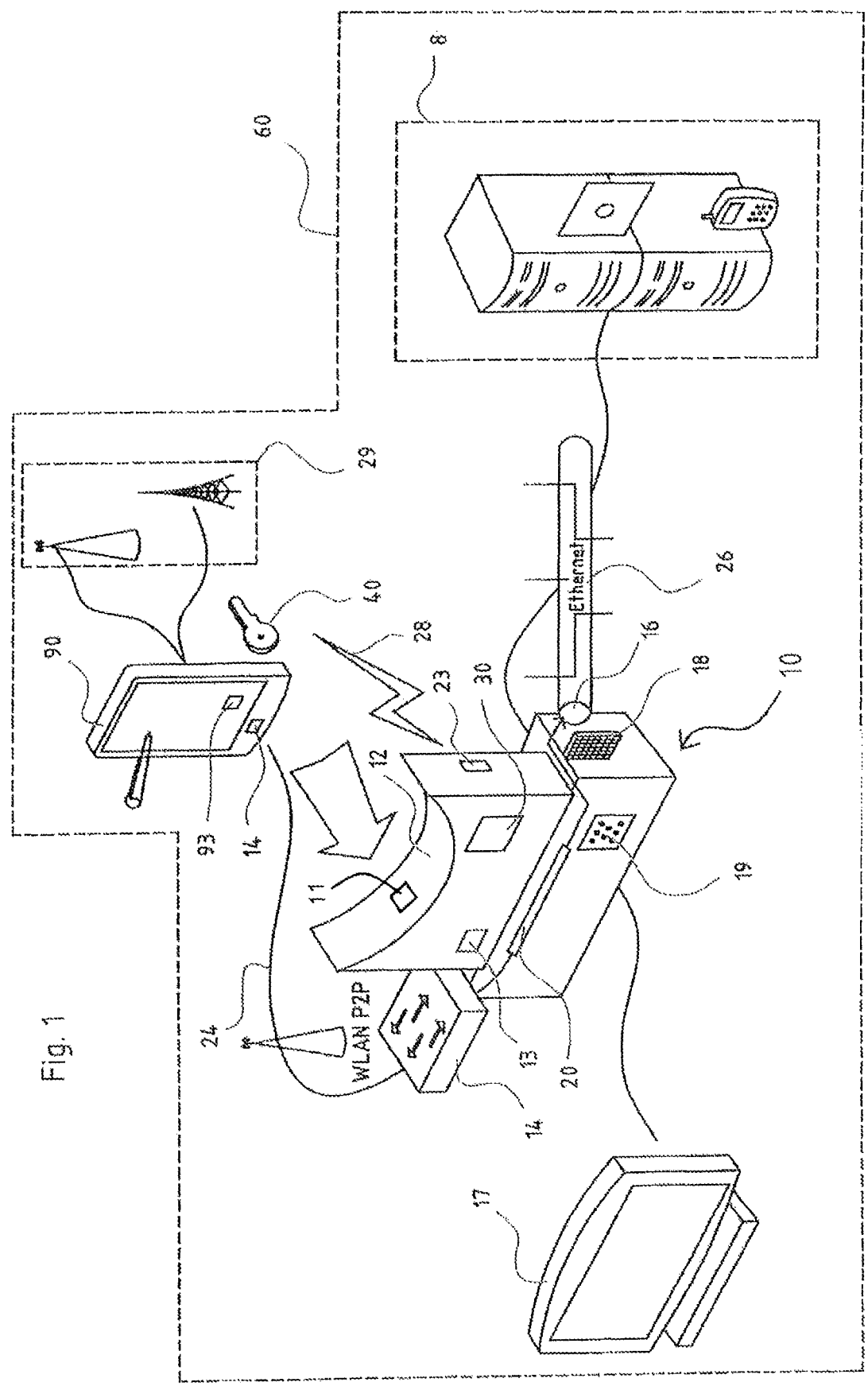
FIG. 1 is a schematic representation of a communication system according to the invention which includes a docking station according to the invention.

FIG. 1 is a schematic representation of a present preferred communication system 60 according to the invention having a communication infrastructure 8, which may, for example, be a local area network or wide area network of a company. A tablet PC 90 or other mobile communication device can be connected to the communication infrastructure 8. The tablet PC 90 is usually connected to a communications network 29, such as a wireless infrastructure (WLAN or cellular network). Generally the tablet PC 90 or other mobile communication device will be outside of the company IT structure to which it is to be connected. The tablet PC 90 contains an NFC and/or Bluetooth interface, or has an RFID adhesive label. The tablet PC 90 or the adhesive label attached to it stores, in addition to information for establishing a P2P connection to a docking station 10, a certificate 40. That certificate contains authorization information that was issued by the infrastructure management of the company to which the tablet PC 90 is to be connected. Alternatively, the certificate could be a certificate issued by a third-party but authorized by the respective companies whose communication infrastructure will be accessed by the mobile device. The NFC or Bluetooth interface 93 generates a wireless transmission, by which the tablet PC 90 can signal its presence in the vicinity of the docking station 10. In addition, this interface is used to transmit the certificate 40 to the docking station 10.

The docking station 10 in turn comprises a cradle 12, which is shown in FIG. 1 as a rounded surface, for setting down, or storing the tablet-PCs 90. The cradle sits on a transfer device 20 which has a housing that supports the cradle and other components of the docking station. If desired the cradle may be integrally formed with the housing. Alternatively the cradle may not be attached to or rest on the transfer device 20. In addition, the docking station 10 includes a detection device 23 (for example, an RFID circuit) for detecting the presence of the tablet-PCs 90.

The tablet-PC 90 and the docking station 10 each have a P2P wireless interface 14 to establish an appropriate communication link 24. The docking station 10 also comprises an Ethernet interface 16 to establish an additional communication link 26 (Ethernet connection) with the communication infrastructure 8 of the company. The detection device, authentication device, first interface, second interface and transfer device can be attached to either or both of the housing and the cradle.

Once the tablet-PC 90 comes close to or within the radio range of the docking station 10, this approach is detected and the certificate 40 is transmitted to the docking station 10 via the NFC-/Bluetooth interface 14. The certificate 40 is validated through a dedicated or shared service—which can be local or in the cloud—which then sends the data required to establish a P2P connection from the tablet PC 90 to the docking station 10. The docking station 10 then establishes the P2P connection via WLAN. This connection is then passed to the LAN 26 by means of a transfer device 20 in the form of an Ethernet switch and/or router in the docking station 10.

It should be noted that the tablet PC 90 only represents the mobile communications devices or telecommunications devices that can be connected to the communication infrastructure 8 by means of the present invention using the docking station 10.

If the WLAN connection 24 between the tablet PC 90 and the docking station 10 breaks, the connection to the LAN 26 is also interrupted. The tablet PC 90 then switches to the preferred wireless network 29 and logs itself in into the wireless network 29.

The docking station 10 also preferably has built-in speaker 19. This speaker 19 can be used to improve the audio quality of the docking station 10—either in addition to or instead of using the speakers of the tablet PC 90. The docking station 10 also preferably includes a connector for connecting an external display 17, which can be used for the replication of the tablet PC 90 display on an external monitor, if the tablet PC 90 permits. Alternatively, the docking station may support the wireless connection of playback devices, such as via the "Digital Living Network Alliance" DLNA standard (see http://www.dlna.org/ or wireless USB.

A firewall 18 is also preferably integrated in the docking station 10 that can reliably prevent malware or unwanted software to pass via the docking station 10 onto the communication infrastructure 8. The firewall can be software in a non-transitory memory and provides that protection without regard to the configuration of the communication device 90 to be connected via the docking station 10 to the communication infrastructure 8. The docking station 10 also preferably includes a memory 13 that stores the authentication key that identifies the docking station in question as the standard docking station for a specific communications device 90. This way, the corresponding communication device 90 can immediately be connected to the communication infrastructure 8 via the docking station 10 without validating the certificate via an appropriate service. The validation and the connection are therefore possible even if the validation service is not currently available.

The docking station 10 also preferably comprises a universal charging station 11 for charging the battery of a communication device 90 connected via the docking station 10. Preferably the charging station can charge that battery wirelessly regardless of the specific configuration and features of the communication device. This considerably improves the convenience of the docking station 10 and the versatility of its use.

The docking station 10 preferably further includes an Ethernet port (not shown) to which for example a PC can be connected, according to the principle of "one-wire-to-the-desk" or "only one cable to the desk".

The external monitor 17 can be connected, for example via an HDMI, DVI or VGA cable to the docking station 10.

The use of a mechanical switch or a press-contacting surface (on which the communication terminal 90 can be placed) can be provided instead of, or in addition to, the above-described capability of a wireless detection by the docking station 10 of the approach or presence of a communication device 90.

It should be noted that, with the present invention, any mobile communication device such as smart phones, tablet PCs, etc. can be connected to a company's IT structure in a safer, more convenient and flexible way. By using the peer-to-peer wireless connection, traffic can be diverted advantageously from the WLAN infrastructure that would or could otherwise be used by the mobile device.

Figure 2:
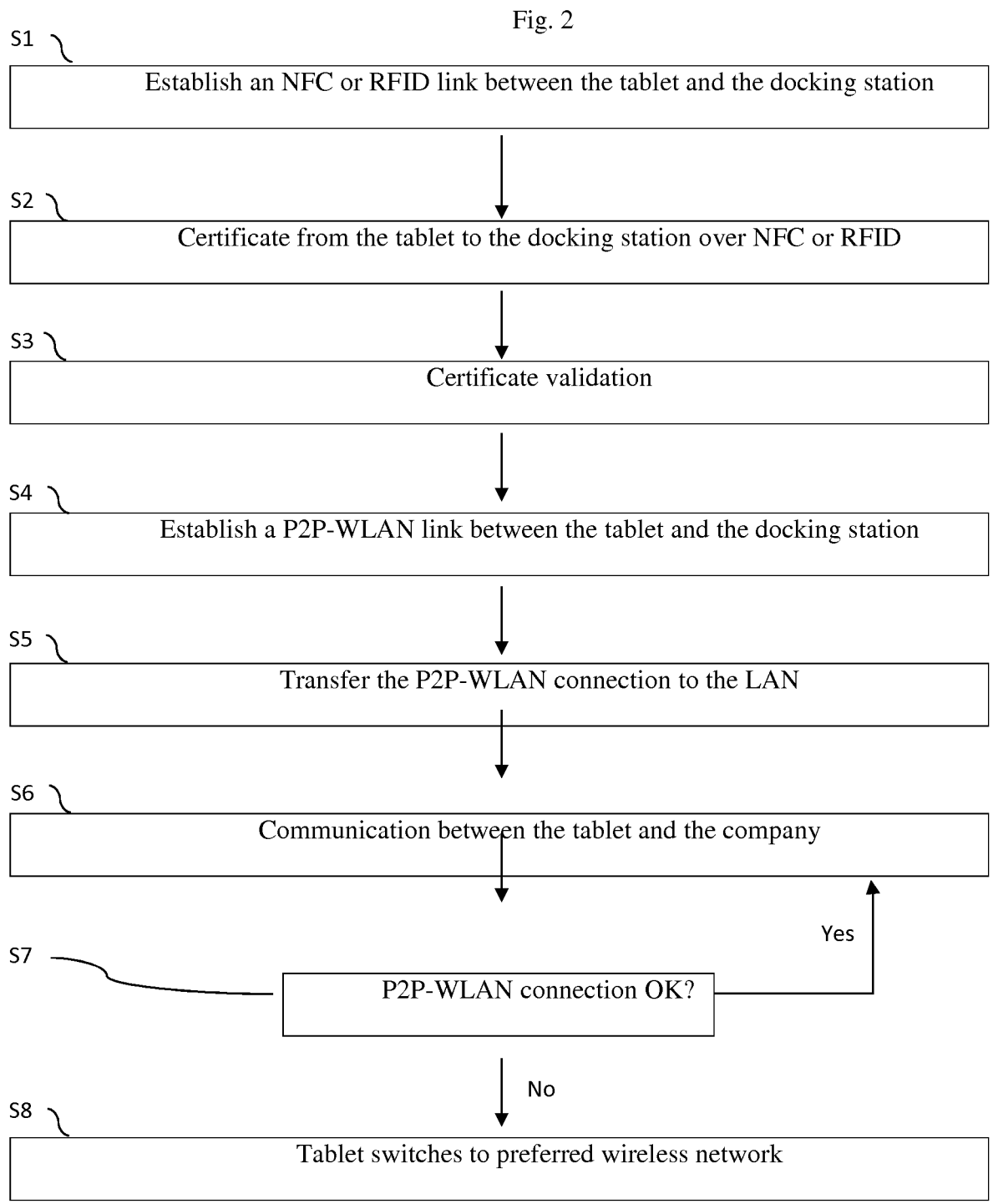
FIG. 2 is a flow chart for an embodiment of the invented method.

The sequence of a present preferred method according to the invention for connecting a mobile communication device 90 to an at least partially wire-based communication infrastructure 8 of a company is summarized in FIG. 2. In step S1, a Near Field Communication (NFC connection) or an RFID connection is first established between the tablet computer 90 and the docking station 10 as soon as the tablet PC 90 has come within a selected distance of the docking station 10 at which that connection can be established. Thereafter, a certificate 40 is sent from the tablet PC 90 to the docking station 10 via the aforementioned link (see step S2). In step S3, the certificate 40 is checked. If the certificate is valid, a P2P wireless connection between the tablet PC 90 and the docking station 10 is established in step S4. This connection is then passed in step S5 to the LAN which connects the docking station 10 to the communication infrastructure 8. After that, the communication between the tablet PC 90 and the company can take place in step S6. This communication is maintained as long as the P2P wireless connection between Tablet PC 90 and the docking station 10 as well as the LAN connection 26 between the docking station 10 and the communication infrastructure 8 works. As indicated in step S7 when a check of the proper functioning of this connection indicates that it no longer or adequately works, the tablet PC 90 automatically switches according to step S8 to a communication with a wireless network 29 of his choice so that it maintains at least some communication capabilities. For example, that wireless network may provide Internet access, but may not provide access to the company communications infrastructure.

It should be noted that the described characteristics of the represented embodiments of the invention, such as the type and design of the individual equipment parts, interfaces and communication links may be otherwise embodied within the scope of the following claims, unless otherwise stated or prohibited for technical reasons.

What is claimed is:

1. A docking station for connecting a mobile communication device to an at least partially wire-based communication infrastructure comprising:
   a cradle for the storage of the mobile communication device,
   a detection device configured to detect a presence of the mobile communication device when the mobile communication device is within a selected distance from the detection device at which a wireless transmission of a certificate containing authentication information is sendable wirelessly from the mobile communication device to the docking station for reception of the certificate,
   a first interface configured to provide a first peer-to-peer wireless communication link directly between the docking station and the communication device for wirelessly transmission of the certificate from the mobile communication device to the docking station in response to detection of the mobile communication device being within the selected distance while the mobile communication device is remote from the communication infrastructure and is unconnected to the communication infrastructure,
   a second interface configured to provide a second wired communication link between the docking station and the communication infrastructure,
   a transfer device configured to switch the first peer-to-peer wireless communication link to the second wired communication link in response to validation of the authentication information of the certificate to communicatively connect the mobile communication device to the communication infrastructure, and
   a firewall integrated into the docking station that is configured to protect the communication infrastructure from unwanted software originating from the mobile communication device such that unwanted software originating from the mobile communication device is prevented from passing into the communication infrastructure via the docking station after the mobile communication device is connected to the communication infrastructure via the second interface.

2. The docking station of claim 1, comprising:
   an authentication device, the authentication device configured to receive the authentication information from the mobile communication device to validate the certificate to validate credentials of the mobile communication device to communicate with the communication infrastructure based on the certificate, the authentication device configured to provide data required to switch the first peer-to-peer wireless communication link to the second wired communication link in response to validation of the authentication information of the certificate.

3. The docking station of claim 2 wherein the detection device, authentication device, first interface, second interface and transfer device are attached to the cradle or a housing attached to the cradle.

4. The docking station of claim 1, wherein an authentication device is remote from the cradle and is communicatively connected to the docking station.

5. The docking station of claim 4 wherein the authentication device is configured to receive the authentication information from the mobile communication device to validate credentials of the mobile communication device to communicate with the communication infrastructure based on the certificate, the authentication device configured to send data required to switch the first peer-to-peer wireless communication link to the second wired communication link for connection of the mobile communication device to the communication infrastructure in response to validation of the credentials.

6. The docking station according to claim 1 wherein the detection device is configured to provide one of: a Near Field Communication directly between the mobile communication device and the docking station and a radio frequency identification communication directly between the mobile communication device and the docking station by which the docking station detects the presence of the mobile communication device via the certificate and receives the authentication information from the mobile communication device via the certificate.

7. The docking station of claim 1 wherein the transfer device is configured as a router or an Ethernet switch, wherein the certificate is transmitted via a radio frequency identification chip or a radio frequency identification adhesive label attached to the mobile communication device and the detection device is configured to react to the radio frequency identification chip or the radio frequency identification adhesive label; and
   wherein the transfer device is configured to switch the first peer-to-peer wireless communication link to the second wired communication link such that the mobile communication device is communicatively connectable to the communication infrastructure via only the second wired communication link and the first peer-to-peer wireless communication link after the mobile communication device is authenticated based on the authentication information of the certificate.

8. The docking station of claim 1 also comprising a memory device for storing an authentication key for the authentication information and wherein the unwanted software is malware.

9. The docking station according to claim 1 also comprising a memory device for storing an authentication key for the authentication information, the docking station being configured to authenticate the mobile communication device via the authentication information and the authentication key without use of a service hosted by another device to enable communication between the mobile communication device and the communication infrastructure such that the mobile communication device is communicatively connectable to the communication infrastructure via only the second wired communication link after the mobile communication device is authenticated based on the authentication information of the certificate via use of the authentication key.

10. The docking station of claim 9 wherein the authentication information identifies resources of the communication infrastructure to which the mobile communication device is authorized for connection.

11. The docking station according to claim 1 also comprising a universal charging station for charging a battery positioned in the mobile communication device.

12. The docking station of claim 1 wherein the universal charging station is suitable for wireless recharging.

13. The docking station according to claim 1 also comprising a speaker attached to the cradle or a housing attached to the cradle.

14. The docking station of claim 1 also comprising a display configured for at least one of a wired connection and a wireless connection to the mobile communication device.

15. The docking station of claim 1 also comprising a memory device for storing an authentication key for the authentication information, the docking station being configured to authenticate the mobile communication device via the authentication information and the authentication key without use of a service hosted by another device to enable communication between the mobile communication device and the communication infrastructure via the docking station based on the authentication information.

16. A communication system comprising:
a docking station, the docking station comprising:
  a cradle to receive a mobile communication device,
  a detection device configured to detect a presence of the mobile communication device when the mobile communication device is within a selected distance from the detection device at which a wireless transmission of a certificate containing authentication information is sendable wirelessly from the mobile communication device to the docking station for reception of the certificate,
  a first interface configured to provide a first peer-to-peer wireless communication link directly between the docking station and the mobile communication device for transmission of the certificate from the mobile communication device to the docking station upon the mobile communication device being within the selected distance while the mobile communication device is remote from the communication infrastructure and is unconnected to the communication infrastructure,
  a second interface configured to provide a second wired communication link between the mobile communication device and a communications infrastructure via the docking station upon validation of the certificate receivable via the first interface, and
  a transfer device configured to switch the first peer-to-peer wireless communication link to the second wired communication link such that the mobile communication device is communicatively connectable to the communication infrastructure via the second wired communication link after the mobile communication device is authenticated based on the authentication information of the certificate,
  a firewall integrated in the docking station that is configured to protect the communication infrastructure from unwanted software originating from the mobile communication device such that unwanted software originating from the mobile communication device is prevented from passing into the communication infrastructure via the docking station after the mobile communication device is connected to the communication infrastructure via the second interface; and
the communication infrastructure connected to the docking station via the second wired communication link.

17. The communication system of claim 16 comprising:
the mobile communication device, the mobile communication device comprising:
  a wireless transmission device to signal a presence of the mobile communication device when in proximity of the docking station and for transmitting the certificate having authentication information to the docking station via radio frequency identification or Near Field Communication, and
  a first interface for providing the first peer-to-peer wireless communication link with the first interface of the docking station.

18. The communication system of claim 16, comprising:
an authentication device connected to the cradle or a housing connected to the cradle, the authentication device configured to receive the authentication information of the certificate to validate the certificate to validate credentials of the mobile communication device to communicate with the communication infrastructure based on the certificate, the authentication device configured to provide data required for the mobile communication device to be communicatively connected to the communication infrastructure via the second interface in response to validation of the certificate.

19. The communication system of claim 16, comprising:
an authentication device communicatively connected to the docking station, the authentication device configured to receive the authentication information from the mobile communication device to validate credentials of the mobile communication device to communicate with the communication infrastructure based on the certificate, the authentication device configured to send data required for the mobile communication device to be communicatively connected to the communication infrastructure via the second interface in response to validation of the credentials.

20. A method for connecting a mobile communication device to a communication infrastructure comprising:
providing a docking station, the docking station comprising:
  a housing,
  a cradle connected to the housing for the storage of the mobile communication device,
  a detection device configured to detect a presence of the mobile communication device when the mobile communication device is within a selected distance from the detection device, the detection device configured to detect the presence of the mobile communication terminal via one of: (i) a Near Field Communication directly between the mobile communication device and the docking station and (ii) a radio frequency identification communication directly between the mobile communication device and the docking station,
  a first interface configured to provide a peer to peer wireless local area network communication connection directly between the docking station and the communication device while the mobile communication device is remote from the communication infrastructure and is unconnected to the communication infrastructure,
  a second interface configured to provide a wired communication link between the mobile communication device and the communications infrastructure, and
  a transfer device configured to switch the peer to peer wireless local area network communication connection to the wired communication link such that the mobile communication device is communicatively connectable to the communication infrastructure via only the wired communication link, and
  at least one of:
    (i) an authentication device configured to receive authentication information from the mobile communication device via the radio frequency identification communication or the Near Field Communication and validate the authentication information to enable communication between the mobile communication device and the communication infrastructure;

(ii) a memory device for storing an authentication key for the authentication information such that the docking station is configured to authenticate the mobile communication device via the authentication information and the authentication key without use of a service hosted by another device to enable communication between the mobile communication device and the docking station based on the authentication information;

positioning the mobile communication device in the cradle;

the docking station receiving a certificate of the mobile communication terminal via the radio frequency identification communication or Near Field Communication;

upon a determination that authentication information of the certificate validates the mobile communication terminal for communications with the communication infrastructure, switching the wireless local area network communication link to the wired communication link via the transfer device such that the mobile communication device is communicatively connected to the communication infrastructure via the wired communication link; and a firewall integrated into the docking station blocking unwanted software the mobile communication device seeks to transmit to the communication infrastructure via the docking station after the mobile communication device is connected to the communication infrastructure via the second interface.

* * * * *